United States Patent
Yu et al.

(10) Patent No.: US 9,439,190 B2
(45) Date of Patent: Sep. 6, 2016

(54) DEVICE TO-DEVICE D2D COMMUNICATION METHOD AND D2D COMMUNICATION DEVICE

(71) Applicant: Huawei Technologies Co., Ltd., Shenzhen, Guangdong (CN)

(72) Inventors: Rongdao Yu, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 14/464,529

(22) Filed: Aug. 20, 2014

(65) Prior Publication Data

US 2015/0009970 A1 Jan. 8, 2015

Related U.S. Application Data

(63) Continuation of application No. PCT/CN2012/076035, filed on May 25, 2012.

(30) Foreign Application Priority Data

Feb. 23, 2012 (CN) .......................... 2012 1 0042037

(51) Int. Cl.
- *H04W 72/04* (2009.01)
- *H04B 7/26* (2006.01)
- *H04W 72/02* (2009.01)
- *H04W 76/02* (2009.01)

(52) U.S. Cl.
CPC ....... *H04W 72/0446* (2013.01); *H04B 7/2656* (2013.01); *H04W 72/02* (2013.01); *H04W 72/046* (2013.01); *H04W 76/023* (2013.01)

(58) Field of Classification Search
None
See application file for complete search history.

(56) References Cited

U.S. PATENT DOCUMENTS

| 2010/0240312 A1* | 9/2010 | Peng .................. H04W 72/02 455/63.1 |
| 2011/0255450 A1 | 10/2011 | Wang et al. |
| 2012/0021689 A1 | 1/2012 | Han |
| 2012/0051315 A1* | 3/2012 | Wang ................. H04W 72/082 370/329 |
| 2013/0128858 A1* | 5/2013 | Zou ................... H04W 72/0453 370/329 |
| 2013/0170387 A1* | 7/2013 | Wang ................... H04W 4/005 370/252 |

(Continued)

FOREIGN PATENT DOCUMENTS

| CN | 101902822 A | 12/2010 |
| CN | 102325327 A | 1/2012 |

(Continued)

*Primary Examiner* — Kodzovi Acolatse
(74) *Attorney, Agent, or Firm* — Leydig, Voit & Mayer, Ltd.

(57) ABSTRACT

The present invention provides a D2D communication method and a D2D communication device. The method includes: determining a second time slot for transmitting D2D data according to a first time slot for transmitting D2D signaling to a D2D receiver and a synchronous transmission relationship between the D2D signaling and the D2D data, the second time slot being after the first time slot; determining a third time slot for transmitting uplink control information in cellular communication according to the second time slot, the uplink control information being used for indicating an uplink radio resource in the second time slot, and the third time slot being before the second time slot; demodulating the uplink control information in the third time slot to acquire the uplink radio resource in the second time slot; multiplexing the uplink radio resource in the second time slot to perform D2D communication with the D2D receiver.

10 Claims, 3 Drawing Sheets

(56) References Cited

U.S. PATENT DOCUMENTS

2013/0201954 A1* 8/2013 Gao .................. H04W 72/0413
370/329
2013/0230032 A1* 9/2013 Lu ........................ H04W 72/02
370/336

FOREIGN PATENT DOCUMENTS

| WO | WO 2010109303 A2 | 9/2010 |
| WO | WO 2010125427 A1 | 11/2010 |
| WO | WO 2011088619 A1 | 7/2011 |

* cited by examiner

DEVICE TO-DEVICE D2D COMMUNICATION METHOD AND D2D COMMUNICATION DEVICE

CROSS-REFERENCE TO RELATED APPLICATIONS

This application is a continuation of International Patent Application No. PCT/CN2012/076035, filed on May 25, 2012, which claims priority to Chinese Patent Application No. 201210042037.1, filed on Feb. 23, 2012, both of which are hereby incorporated by reference in their entireties.

TECHNICAL FIELD

The present invention relates to the communication field, and more particularly to a D2D (Device-to-Device, D2D) communication method and a D2D communication device.

BACKGROUND

The existing 3G (3rd Generation, 3G) and 4G (4th Generation, 4G) cellular mobile communication system belong to typical infrastructure networks, which replace one high-power transmitter (large coverage area) with multiple low-power transmitters (small coverage area). A small coverage area corresponding to each small transmitting area is referred to as a cell, each cell is allocated a set of channels corresponding to a set of radio resources, neighboring cells use different radio resources, so as to avoid mutual interference, and cells far away from each other can repetitively use the same radio resources, so as to greatly improve system capacity.

However, since the cellular mobile communication system adopts a centralized control mode, all the information transmission is forwarded via a base station, if an information receiver and an information transmitter are relatively close to each other, twice of radio resources will be consumed and transmission efficiency is low.

SUMMARY

Embodiments of the present invention provide a D2D communication method and a D2D communication device, so as to improve transmission efficiency and radio resource utilization.

One aspect is to provide a method, including: determining a second time slot for transmitting D2D data according to a first time slot for transmitting D2D signaling to a D2D receiver and a synchronous transmission relationship between the D2D signaling and the D2D data, where the second time slot is after the first time slot; determining a third time slot for transmitting uplink control information in cellular communication according to the second time slot, where the uplink control information is used for indicating an uplink radio resource in the second time slot of a cellular UE, and the third time slot is before the second time slot; demodulating the uplink control information in the third time slot to acquire the uplink radio resource in the second time slot of the cellular UE; and multiplexing the uplink radio resource in the second time slot of the cellular UE to perform D2D communication with the D2D receiver.

Another aspect is to provide a D2D communication device, including: a determining unit, configured to determine a second time slot for transmitting D2D data according to a first time slot for transmitting D2D signaling to a D2D receiver and a synchronous transmission relationship between the D2D signaling and the D2D data, where the second time slot is after the first time slot; and determine a third time slot for transmitting uplink control information in cellular communication according to the second time slot, where the uplink control information is used for indicating an uplink radio resource in the second time slot of a cellular UE, and the third time slot is before the second time slot; a demodulating unit, configured to demodulate the uplink control information in the third time slot to acquire the uplink radio resource in the second time slot of the cellular UE; and a processing unit, configured to multiplex the uplink radio resource in the second time slot of the cellular UE to perform D2D communication with the D2D receiver.

In embodiments of the present invention, the D2D transmitter and the D2D receiver perform D2D communication by space division multiplexing the uplink radio resource of the cellular UE in the cellular communication, without control of a base station, so as to improve transmission efficiency and radio resource utilization.

BRIEF DESCRIPTION OF DRAWINGS

To illustrate the technical solutions of embodiments of the present invention more clearly, the accompanying drawings used in the embodiments of the present invention will be briefly introduced hereinafter. Apparently, the accompanying drawings show certain embodiments of the present invention, and persons skilled in the art can derive other drawings from them without creative efforts.

DESCRIPTION OF EMBODIMENTS

The technical solutions in the embodiments of the present invention are hereinafter described clearly with reference to the accompanying drawings in the embodiments of the present invention. Obviously, the embodiments described here are part of the embodiments of the present invention but not all of the embodiments. Based on the embodiments of the present invention, all other embodiments derived by persons skilled in the art without any creative efforts fall within the scope of the present invention.

It should be understood that, in embodiments of the present invention, the D2D communication can be a self-organizing communication mode of a terminal without control by a base station or an access point, so that the communication can be achieved by changing one long path to several short paths, for example, nearby local services can be completed directly via relay forwarding or directly communication between terminals without going through a base station.

It should be understood that, in embodiments of the present invention, the D2D transmitter and D2D receiver in D2D communication can be a user equipment (User Equipment, UE), which also can be called a mobile terminal (Mobile Terminal, MT), or a mobile user equipment etc. The user equipment can be a mobile phone (or a "cellular" phone) or a computer with a mobile terminal etc, and thus can be, for example, portable, pocket, hand-held, computerincluded, or car-mounted mobile devices. The embodiments of the present invention are not limited thereto.

Figure 1:
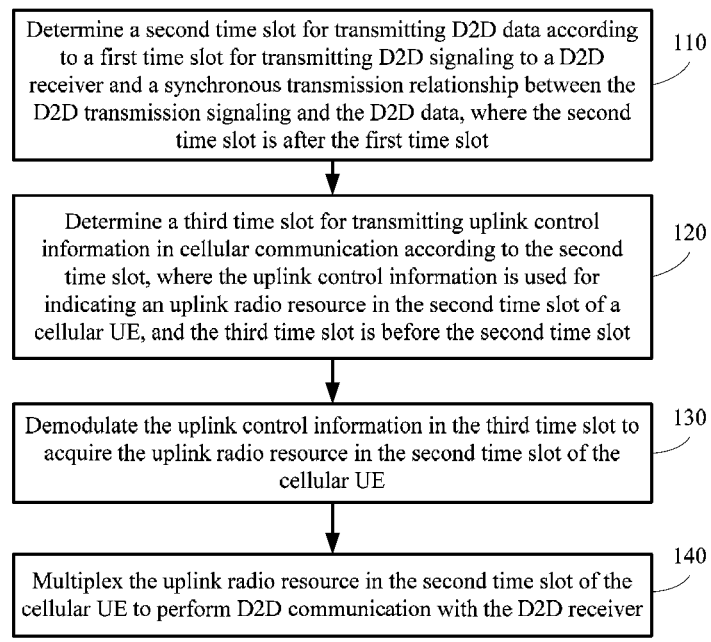
FIG. 1 is a schematic flowchart of a D2D communication method according to an embodiment of the present invention.

FIG. 1 is a schematic flowchart of a D2D communication method according to an embodiment of the present invention. The method shown in FIG. 1 is executed by a D2D transmitter, such as a UE.

110, Determine a second time slot for transmitting D2D data according to a first time slot for transmitting D2D signaling to a D2D receiver and a synchronous transmission relationship between the D2D signaling and the D2D data, where the second time slot is after the first time slot.

Optionally, in embodiments of the present invention, the frame structure for D2D communication can be the same with the frame structure for cellular communication.

Optionally, as an embodiment, the synchronous transmission relationship can include a constant interval between the first time slot and the second time slot. That is to say, the interval between the first time slot and the second time slot is a constant value, and the D2D transmitter can determine the second time slot for transmitting the D2D data according to the first time slot and the constant interval between the first time slot and the second time slot.

120, Determine a third time slot for transmitting uplink control information in cellular communication according to the second time slot, where the uplink control information is used for indicating an uplink radio resource in the second time slot of a cellular user equipment UE, and the third time slot is before the second time slot.

The D2D transmitter can determine the third time slot for transmitting uplink control information according to the second time slot and a prior art timing relationship in the cellular communication.

130, Demodulate the uplink control information in the third time slot to acquire the uplink radio resource in the second time slot of the cellular UE.

140, Multiplex the uplink radio resource in the second time slot of the cellular UE to perform D2D communication with the D2D receiver.

Optionally, as another embodiment, the D2D transmitter can select a first cellular UE, from the cellular UEs, causing minimal interference to the D2D transmitter, and multiplex the uplink radio resource in the second time slot of the first cellular UE.

In embodiments of the present invention, since the D2D transmitter multiplexes the uplink radio resource of a cellular UE having minimal interference to the D2D transmitter to perform D2D communication with the D2D receiver, so that the interference between the D2D communication and the cellular communication can be reduced.

In the existing cellular communication, due to signal transmission delay, the cellular UEs with different distances from the base station have different transmission delays, in order to eliminate interference caused by different transmission delays between the cellular UEs, the base station can notify the UE of corresponding timing advance (Timing Advance, TA), thus the TA can be used to estimate the distance between the cellular UE and the base station. However, the base station carries the TA via a random access channel (Random Access Channel, RACH) response (Response), as a result, the cellular UE only can be aware of its own TA, but cannot acquire the TA of the other cellular UE.

Optionally, as another embodiment, in step 120, the uplink control information also can be used for indicating a TA in the second time slot of the cellular UE, the D2D transmitter can select a first cellular UE, from the cellular UEs, causing minimal interference to the D2D transmitter, so as to maximize the difference between the TA of the first cellular UE and a TA of the D2D transmitter. Since the TA can be used to estimate the distance between the cellular UE and the base station, when the difference between the TA of the first cellular UE and the TA of the D2D transmitter is maximal, the distance between the first cellular UE and the D2D transmitter is the farthest, and the first cellular UE has the minimal interference to the D2D transmitter. Besides, in embodiments of the present invention, the uplink control information indicates the TA, so that the D2D transmitter can acquire the TA according to the uplink control information, and thus determines the interference of the cellular UE to it.

Optionally, in the cellular communication, the uplink control information also can be used for indicating the TA of the cellular UE. In this way, the cellular UE not only can be aware of its own TA, but also can acquire the TA of other cellular UEs, and thus can determine the distance between the cellular UEs.

Optionally, as another embodiment, the D2D transmitter can select a first cellular UE, from the cellular UEs, causing minimal interference to the D2D transmitter according to an average interference list of the cellular UE to the D2D transmitter, where the average interference list is acquired according to a monitored sounding (Sounding) signal transmitted by the cellular UE to a base station, and the sounding signal is used for estimating interference of the cellular UE to the D2D transmitter. That is to say, the D2D transmitter can monitor a sounding signal transmitted by the cellular UE to the base station, and estimate the interference of the cellular UE to it according to the sounding signal. The D2D transmitter can acquire an average interference list of the cellular UE to it within a certain period. For example, the period for acquiring the average interference list can be between the first time slot and the second time slot, or starts from a certain time slot before the first time slot and ends before the second time slot. The embodiments of the present invention are not limited thereto.

Optionally, as another embodiment, the D2D transmitter can transmit to the D2D receiver an indication information for indicating the second time slot and the uplink radio resource multiplexed in the second time slot of the cellular UE, so that the D2D receiver performs D2D communication using the uplink radio resource in the second time slot of the cellular UE.

In embodiments of the present invention, the D2D transmitter and the D2D receiver perform D2D communication by space division multiplexing the uplink radio resource of the cellular UE in the cellular communication, without control of a base station, so as to improve transmission efficiency and radio resource utilization.

Besides, in the embodiments of the present invention, the D2D transmitter and the D2D receiver perform D2D communication by space division multiplexing the uplink radio resource of the cellular UE in the cellular communication, so that power consumption and cost can be reduced, and blind areas existing in the coverage area of the cellular communication network can be eliminated.

Figure 2:
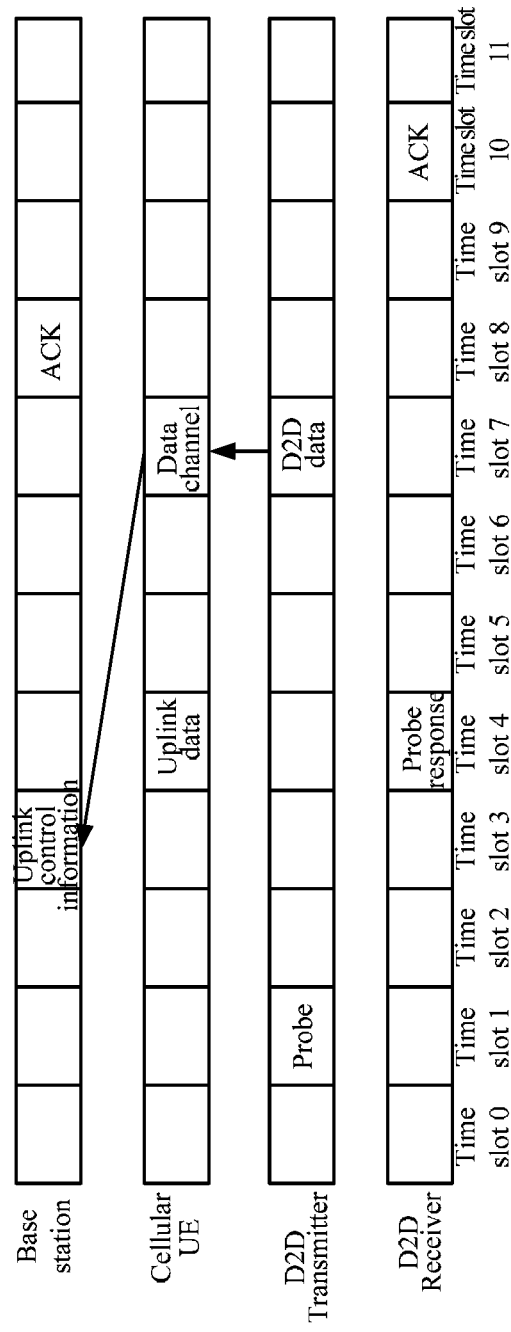
FIG. 2 is a schematic diagram of an example of a frame structure according to an embodiment of the present invention.

Embodiments of the present invention will be described in more detail with reference to specific examples. FIG. 2 is a schematic diagram of one example of a frame structure according to an embodiment of the present invention. In FIG. 2, the cellular communication and D2D communication follows the same frame structure. Taking the synchronous transmission relationship between the D2D signaling and the D2D data as an interval of five time slots as an example, for ease of description, it is assumed that the first time slot for transmitting D2D signaling by the D2D transmitter is a time slot 1.

In FIG. 2, the base station and the cellular UE perform cellular communication, the D2D transmitter and the D2D receiver perform D2D communication. For example, in the cellular communication, the cellular UE can transmit uplink data to the base station in time slot 4, and the base station can feed acknowledge (Acknowledge, ACK) information back to the cellular UE in time slot 8.

In the D2D communication, the D2D transmitter transmits a D2D probe (Probe) message, i.e., D2D signaling, in time slot 1. The D2D transmitter can determine that the second time slot for transmitting the D2D data is time slot 7 according to the synchronous transmission relationship between the D2D signaling and the D2D data. Besides, time slot 7 is also a data channel of the cellular UE, for example, in an LTE system, time slot 7 is a physical downlink shared channel (Physical Downlink Share Channel, PDSCH). Therefore, the D2D transmitter can multiplex the uplink radio resource of the cellular UE in time slot 7, thus it is needed to acquire the uplink radio resource in time slot 7 of the cellular UE. According to the timing relationship between the uplink control information and data transmission in the cellular communication as well as time slot 7, the D2D transmitter can determine that the third time slot for transmitting the uplink control information for indicating the uplink radio resource in time slot 7 of the cellular UE in the cellular communication is time slot 3, and the uplink control information can be carried in a physical downlink control channel (Physical Downlink Control Channel, PDCCH) and transmitted. Therefore, the D2D transmitter can demodulate the uplink control information in time slot 3 to acquire the uplink radio resource in time slot 7 of the cellular UE. In order to reduce interference between the cellular communication and the D2D communication, the D2D transmitter can multiplex the uplink radio resource in time slot 7 of the cellular UE having minimal interference to it, and perform D2D communication with the D2D transmitter.

As shown in FIG. 2, the process of the D2D communication can be as follows: the D2D transmitter transmits a D2D probe message in time slot 1, and the D2D receiver can transmit a D2D probe response message to the D2D transmitter in time slot 4. Then, the D2D transmitter and the D2D receiver establish a connection with each other. After determining time slot 7 for transmitting D2D data and the uplink radio resource multiplexed in time slot 7 of the cellular UE, the D2D transmitter can transmit an indication information to the D2D receiver to notify the D2D receiver to receive the D2D data using the uplink radio resource in time slot 7 of the indicated cellular UE. The D2D transmitter can multiplex the uplink radio resource in time slot 7 of the cellular UE to transmit D2D data and a control signaling for demodulating the D2D data to the D2D receiver, and the D2D receiver can feed an ACK information back to the D2D transmitter in time slot 10 after receiving the D2D data and the control signaling for demodulating the D2D data in time slot 7. Then, a single process of the D2D communication is completed.

It should be noted that, the example in FIG. 2 is merely intended to facilitate persons skilled in the art to better understand the present invention, but are not intended to limit the scope of the embodiments of the present invention. Obviously, persons skilled in the art can make various equivalent modifications or variations on the basis of the example in FIG. 2, and such variations or modifications also fall within the scope of the embodiments of the present invention.

In embodiments of the present invention, the D2D transmitter and the D2D receiver perform D2D communication by space division multiplexing the uplink radio resource of the cellular UE in the cellular communication, without control of a base station, so as to improve transmission efficiency and radio resource utilization.

Besides, in embodiments of the present invention, the D2D transmitter and the D2D receiver perform D2D communication by space division multiplexing the uplink radio resource of the cellular UE in the cellular communication, so that power consumption and cost can be reduced, and blind areas existing in the coverage area of the cellular communication network can be eliminated.

Figure 3:
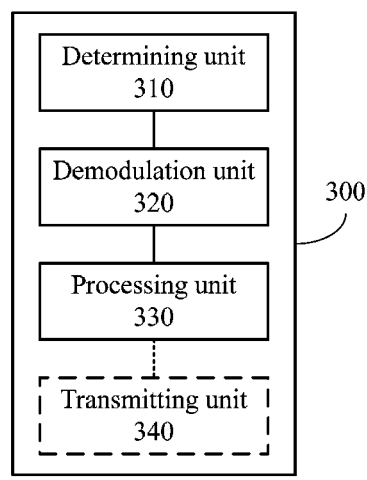
FIG. 3 is a block diagram of a D2D communication device according to an embodiment of the present invention.

FIG. 3 is a block diagram of a D2D communication device according to an embodiment of the present invention. An example of device 300 in FIG. 3 is a D2D transmitter, such as a UE. The device 300 includes a determining unit 310, a demodulation unit 320 and a processing unit 330.

The determining unit 310 is configured to determine a second time slot for transmitting D2D data according to a first time slot for transmitting D2D signaling to a D2D receiver and a synchronous transmission relationship between the D2D signaling and the D2D data, where the second time slot is after the first time slot; and determine a third time slot for transmitting uplink control information in cellular communication according to the second time slot, where the uplink control information is used for indicating an uplink radio resource in the second time slot of a cellular UE, and the third time slot is before the second time slot. The demodulating unit 320 is configured to demodulate the uplink control information in the third time slot to acquire the uplink radio resource in the second time slot of the cellular UE. The processing unit 330 is configured to multiplex the uplink radio resource in the second time slot of the cellular UE to perform D2D communication with the D2D receiver.

In embodiments of the present invention, the D2D transmitter and the D2D receiver perform D2D communication by space division multiplexing the uplink radio resource of the cellular UE in the cellular communication, without control of a base station, so as to improve radio resource utilization and transmission efficiency.

Besides, in the embodiments of the present invention, the D2D transmitter and the D2D receiver perform D2D communication by space division multiplexing the uplink radio resource of the cellular UE in the cellular communication, so that power consumption and cost can be reduced, and blind areas existing in the coverage area of the cellular communication network can be eliminated.

Other functions and operations of the device 300 can be referred to the process related to the D2D transmitter in the method embodiment in FIG. 1 and FIG. 2, and no details will be given here to avoid repetition.

Optionally, as an embodiment, the processing unit 330 can select a first cellular UE, from the cellular UEs, causing minimal interference to the D2D transmitter, and multiplex the uplink radio resource in the second time slot of the first cellular UE.

In embodiments of the present invention, since the D2D transmitter multiplexes the uplink radio resource of a cellular UE having minimal interference to the D2D transmitter to perform D2D communication with the D2D receiver, so that the interference between the D2D communication and the cellular communication can be reduced.

Optionally, as another embodiment, the uplink control information also can be used for indicating a TA in the second time slot of the cellular UE. The processing unit 330 can select a first cellular UE, from the cellular UEs, causing minimal interference to the D2D transmitter, so as to maximize the difference between the TA of the first cellular UE and the TA of the D2D transmitter.

Optionally, as another embodiment, the processing unit 330 can select a first cellular UE, from the cellular UEs, causing minimal interference to the D2D transmitter according to an average interference list of the cellular UE to the D2D transmitter, where the average interference list is acquired according to a monitored sounding signal transmitted by the cellular UE to a base station, and the sounding signal is used for estimating interference of the cellular UE to the D2D transmitter.

Optionally, as another embodiment, the device 300 also can include a transmitting unit 340, configured to transmit to the D2D receiver an indication information for indicating the second time slot and the uplink radio resource multiplexed in the second time slot of the cellular UE, so that the D2D receiver performs D2D communication using the uplink radio resource in the second time slot of the cellular UE.

Optionally, as another embodiment, the synchronous transmission relationship can include a constant interval between the first time slot and the second time slot.

In embodiments of the present invention, the D2D transmitter and the D2D receiver perform D2D communication by space division multiplexing the uplink radio resource of the cellular UE in the cellular communication, without control of a base station, so as to improve transmission efficiency and radio resource utilization.

Besides, in embodiments of the present invention, the D2D transmitter and the D2D receiver perform D2D communication by space division multiplexing the uplink radio resource of the cellular UE in the cellular communication, so that power consumption and cost can be reduced, and blind areas existing in the coverage area of the cellular communication network can be eliminated.

Persons skilled in the art can be realized that the various exemplary units and algorithm steps described in the embodiments disclosed herein can be implemented by an electronic hardware, or a combination of computer software and electronic hardware. Whether these functions are executed through hardware or software depends on specific applications and design restrictions of the technical solutions. Professional technicians may implement the described functions in varying ways for each specific application, but such implementation decisions should not be interpreted as causing a departure from the scope of the present invention.

Persons skilled in the art can understand that, for convenience and brevity of description, the detailed working procedures of the systems, apparatuses, and units described above can be deduced effortlessly from the corresponding procedures in the method embodiments, and are not repeated herein.

Understandably, in the embodiments described herein, the disclosed systems, apparatuses and methods may be implemented in other modes. For example, the device embodiments above are illustrative in nature, for example, the division of the units are defined from the perspective of logical functions only and may be defined in a different way in practical application, for example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, which may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present embodiment.

Besides, all functional units in each embodiment of the present invention may be physically stand-alone, or integrated into a processing unit, or two or more of the units are integrated into one unit.

When being implemented as a software function unit and sold or used as a stand-alone product, the functions may be stored in a computer-readable storage medium. Based on this understanding, the essence of the technical solution of the present invention, or the part which contributes to the prior art, or part of the technical solutions, may be embodied in a software product. The software product may be stored in a computer-readable storage medium and incorporates several instructions for instructing a computer device (for example, personal computer, server, or network device etc) to execute all or part of the steps of the method specified in any embodiment of the present invention. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk etc.

The above descriptions are merely preferred embodiments of the present invention, but not intended to limit the protection scope of the present invention. Any variations or replacement that can be easily derived by persons skilled in the art without departing from the technical scope disclosed by the present invention shall fall within the protection scope of the present invention. Therefore, the protection scope of the present invention is subject to the appended claims.

What is claimed is:

1. A device-to-device (D2D) communication method, comprising:

determining, by a D2D transmitter, a second time slot for transmitting D2D data according to a first time slot for transmitting D2D signaling to a D2D receiver and a synchronous transmission relationship between the D2D signaling and the D2D data, wherein the second time slot is after the first time slot:

determining, by the D2D transmitter, a third time slot for transmitting uplink control information in cellular communication according to the second time slot, wherein the uplink control information is used for indicating an uplink radio resource in the second time slot of a cellular user equipment (UE), and the third time slot is before the second time slot;

demodulating, by the D2D transmitter, the uplink control information in the third time slot to acquire the uplink radio resource in the second time slot of the cellular UE; and multiplexing, by the D2D transmitter, the uplink radio resource in the second time slot of the cellular UE to perform D2D communication with the D2D receiver;

wherein the multiplexing the uplink radio resource in the second time slot of the cellular UE comprises: selecting a first cellular UE, from a plurality of cellular UEs, causing minimal interference to the D2D transmitter; and multiplexing the uplink radio resource in the second time slot of the first cellular UE.

2. The method according to claim 1, wherein the uplink control information is also used for indicating a timing advance (TA) in the second time slot of the cellular UE, 2 the selecting a first cellular UE comprises: selecting a first cellular UE, from the plurality of cellular UEs, so as to cause minimal interference to the D2D transmitter, and so as to maximize a difference between the TA of the first cellular UE and a TA of the D2D transmitter.

3. The method according to claim 1, wherein the selecting a first cellular UE comprises: selecting a first cellular UE, from the plurality of cellular UEs, so as to cause minimal interference to the D2D transmitter based on an average interference list of the cellular UE to the D2D transmitter, wherein the average interference list is acquired according to a monitored sounding signal transmitted by the cellular UE to a base station, and the sounding signal is used for estimating interference of the cellular UE to the D2D transmitter.

4. The method according to claim 1, further comprising: transmitting to the D2D receiver indication information for indicating the second time slot and the uplink radio resource multiplexed in the second time slot of the cellular UE.

5. The method according to claim 1, wherein the synchronous transmission relationship comprises a constant interval between the first time slot and the second time slot.

6. A device-to-device (D2D) communication device, comprising a processor and a non-transitory processor-readable medium having processor-executable instructions stored thereon, the processor-executable instructions including a plurality of units, the units including:
a determining unit, configured to a) determine a second time slot for transmitting D2D data according to a first time slot for transmitting D2D signaling to a D2D receiver and a synchronous transmission relationship between the D2D signaling and the D2D data, wherein 3 the second time slot is after the first time slot, and b) determine a third time slot for transmitting uplink control information in cellular communication according to the second time slot, wherein the uplink control information is used for indicating an uplink radio resource in the second slot of a cellular UE, and the third time slot is before the second time slot;
a demodulating unit, configured to demodulate the uplink control information in the third time slot to acquire the uplink radio resource in the second time slot of the cellular user equipment (UE); and a processing unit, configured to multiplex the uplink radio resource in the second time slot of the cellular UE to perform D2D communication with the D2D receiver;
wherein the processing unit is configured to a) select a first cellular UE, from a plurality of cellular UEs, causing minimal interference to the D2D transmitter, and b) multiplex the uplink radio resource in the second time slot of the first cellular UE.

7. The device according to claim 6, wherein the uplink control information is further used for indicating a timing advance (TA) in the second time slot of the cellular UE, the processing unit is configured to select a first cellular UE, from the cellular UEs, so as to cause minimal interference to the D2D transmitter, and so as to maximize the difference between the TA of the first cellular UE and a TA of the D2D transmitter.

8. The device according to claim 6, wherein the processing unit is configured to select a first cellular UE, from the cellular UEs, so as to cause minimal interference to the D2D transmitter based on an average interference list of the cellular UE to the D2D transmitter, wherein the average interference list is acquired according to a 4 monitored sounding signal transmitted by the cellular UE to a base station, and the sounding sianal is used for estimating interference of the cellular UE to the D2D transmitter.

9. The device according to claim 6, further comprising: a transmitting unit, configured to transmit to the D2D receiver indication information for indicating the second time slot and the uplink radio resource multiplexed in the second time slot of the cellular UE, so that the D2D receiver performs D2D communication using the uplink radio resource in the second time slot of the cellular UE.

10. The device according to claim 6, wherein the synchronous transmission relationship comprises a constant interval between the first time slot and the second time slot.

* * * * *

UNITED STATES PATENT AND TRADEMARK OFFICE
CERTIFICATE OF CORRECTION

| | | |
|---|---|---|
| PATENT NO. | : 9,439,190 B2 | Page 1 of 1 |
| APPLICATION NO. | : 14/464529 | |
| DATED | : September 6, 2016 | |
| INVENTOR(S) | : Yu et al. | |

It is certified that error appears in the above-identified patent and that said Letters Patent is hereby corrected as shown below:

On the Title Page

Item (54) and in the Specification, Column 1, Lines 1-3, title of application should read:
-- DEVICE-TO-DEVICE D2D COMMUNICATION METHOD AND D2D COMMUNICATION DEVICE --.

Signed and Sealed this
Third Day of January, 2017

Michelle K. Lee
*Director of the United States Patent and Trademark Office*